United States Patent
Sugita

(10) Patent No.: US 11,653,087 B2
(45) Date of Patent: May 16, 2023

(54) INFORMATION PROCESSING DEVICE, INFORMATION PROCESSING SYSTEM, AND INFORMATION PROCESSING METHOD

(71) Applicant: CANON KABUSHIKI KAISHA, Tokyo (JP)

(72) Inventor: Norio Sugita, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 301 days.

(21) Appl. No.: 17/210,334

(22) Filed: Mar. 23, 2021

(65) Prior Publication Data
US 2021/0306570 A1    Sep. 30, 2021

(30) Foreign Application Priority Data
Mar. 26, 2020   (JP) .............................. JP2020-055643

(51) Int. Cl.
*H04N 23/63* (2023.01)
*H04N 23/62* (2023.01)
*H04N 23/60* (2023.01)

(52) U.S. Cl.
CPC .......... *H04N 23/633* (2023.01); *H04N 23/62* (2023.01); *H04N 23/632* (2023.01); *H04N 23/64* (2023.01)

(58) Field of Classification Search
CPC .... H04N 23/633; H04N 23/62; H04N 23/632; H04N 23/64
See application file for complete search history.

(56) References Cited

U.S. PATENT DOCUMENTS

| | | | | |
|---|---|---|---|---|
| 2012/0008014 A1* | 1/2012 | Ito | ...................... | H04N 1/00183 348/E5.031 |
| 2013/0329111 A1* | 12/2013 | Desai | ..................... | H04N 23/64 348/333.02 |

FOREIGN PATENT DOCUMENTS

| | | |
|---|---|---|
| JP | 2007-027945 A | 2/2007 |
| JP | 2007-036716 A | 2/2007 |
| JP | 2015-088801 A | 5/2015 |

* cited by examiner

*Primary Examiner* — Timothy J Henn
(74) *Attorney, Agent, or Firm* — Cowan, Liebowitz & Latman, P.C.

(57) ABSTRACT

An information processing device includes: an acquiring unit configured to acquire information relating to user operation in an image-capturing device; a specifying unit configured to specify candidates of image-capturing support information to be presented to the user, based on the user operation in the image-capturing device: a control unit configured to control a timing of displaying the specified candidates of the image-capturing support information on a display unit of the image-capturing device, based on the user operation in the image-capturing device; and a setting unit configured to set the image-capturing support information, which is selected by the user, on the image-capturing device, out of the candidates of the image-capturing support information displayed on the display unit of the image-capturing device.

11 Claims, 13 Drawing Sheets

FIG.7

| IMAGE-CAPTURING SUPPORT INFORMATION 701 | IMAGE-CAPTURING SUPPORT INFORMATION CATEGORY 702 | |
|---|---|---|
| PORTRAIT IMAGE CAPTURING OF PEOPLE | BLUR, COMPOSITION | 703 |
| MACRO IMAGE CAPTURING OF FLOWERS | BLUR, ZOOM, COLOR TONE | 704 |
| IMAGE CAPTURING OF MOVING SUBJECT | STOP SUBJECT | 705 |
| IMAGE CAPTURING OF NIGHT VIEW | DARK SCENE, FOCUS ON ENTIRE AREA | 706 |

FIG.8

| OPERATION | IMAGE-CAPTURING SUPPORT INFORMATION CATEGORY | |
|---|---|---|
| Av MODE SELECTION | BLUR | 803 |
| Tv MODE SELECTION | STOP SUBJECT | 804 |
| LIVE VIEW SCANNING | COMPOSITION | 805 |
| WHITE BALANCE SETTING | COLOR TONE | 806 |
| SHUTTER SPEED: DECREASE | DARK SCENE | 807 |
| SHUTTER SPEED: INCREASE | STOP SUBJECT | 808 |
| APERTURE (F VALUE): INCREASE | FOCUS ON ENTIRE AREA | 809 |
| APERTURE (F VALUE): DECREASE | BLUR | 810 |

FIG.10
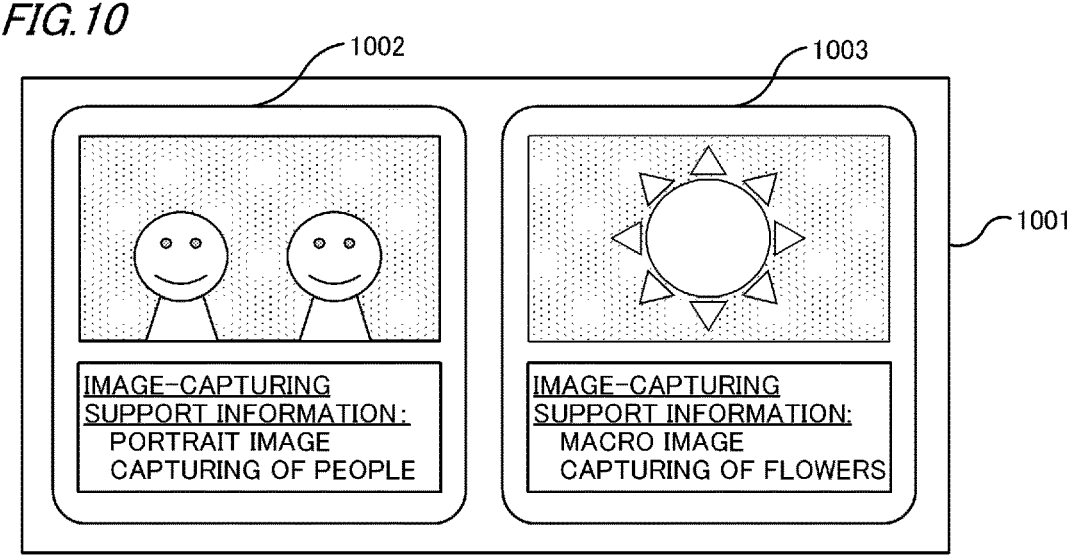
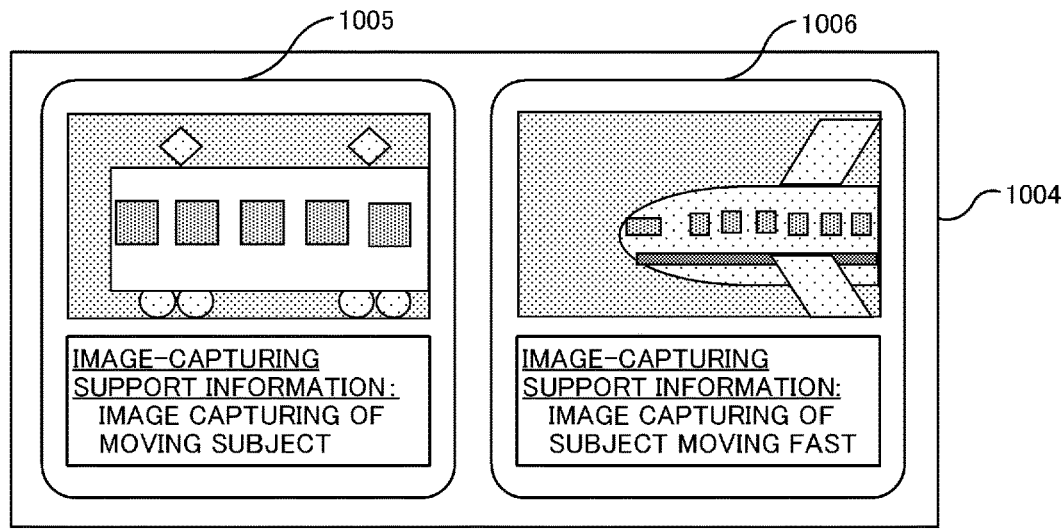
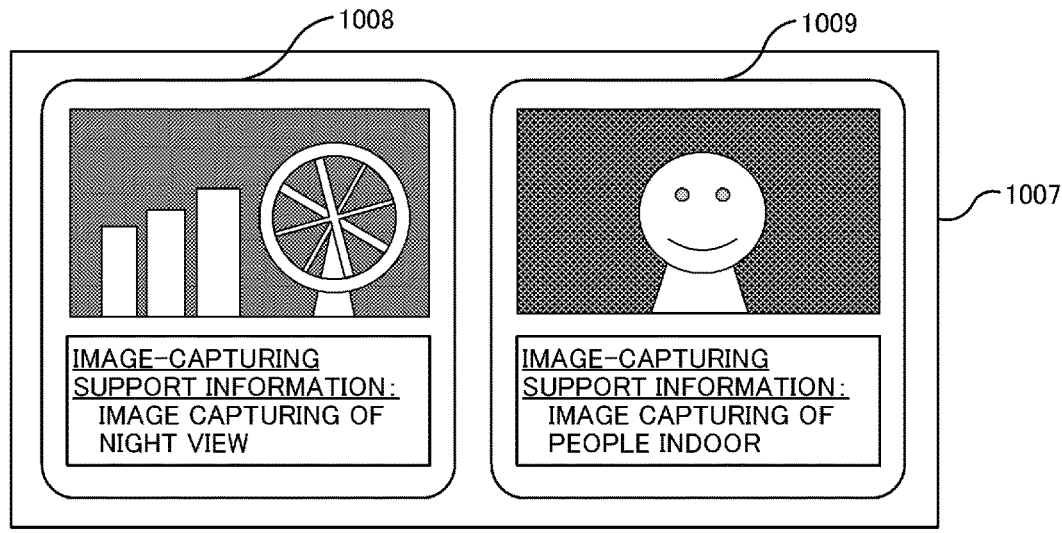

FIG.11

| OPERATION | IMAGE-CAPTURING SUPPORT INFORMATION CATEGORY | |
|---|---|---|
| Av MODE SELECTION | BLUR | 803 |
| Tv MODE SELECTION | STOP SUBJECT | 804 |
| LIVE VIEW SCANNING | COMPOSITION | 805 |
| WHITE BALANCE SETTING | COLOR TONE | 806 |
| SHUTTER SPEED: DECREASE | DARK SCENE | 807 |
| SHUTTER SPEED: INCREASE | STOP SUBJECT | 808 |
| APERTURE (F VALUE): INCREASE | FOCUS ON ENTIRE AREA | 809 |
| APERTURE (F VALUE): DECREASE | BLUR | 810 |
| EXPOSURE SETTING (ISO SENSITIVITY) CHANGE | DARK SCENE | 1101 |

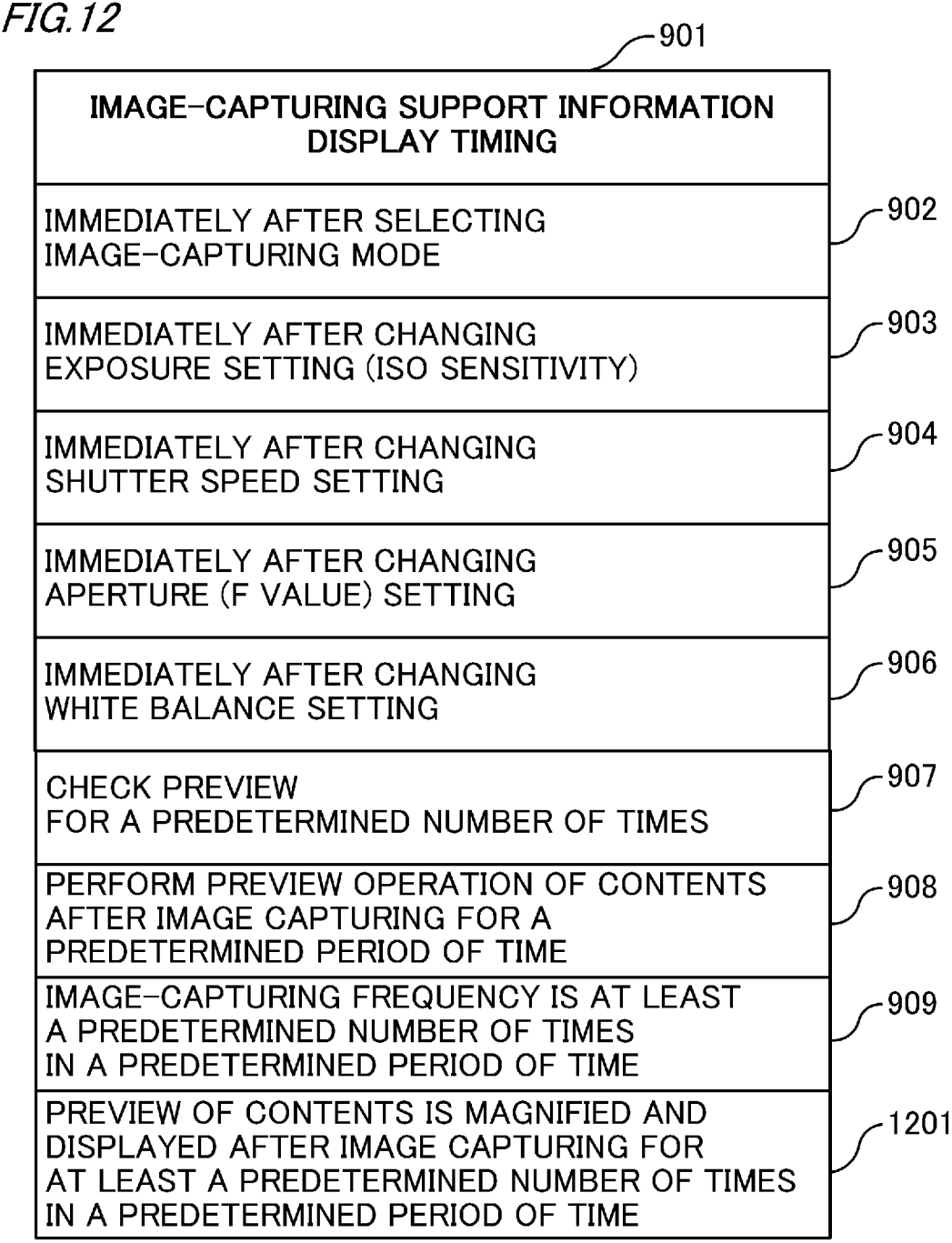

FIG.13

| CONTENTS ANALYSIS RESULT AFTER IMAGE CAPTURING | IMAGE-CAPTURING SUPPORT INFORMATION CATEGORY |
|---|---|
| IMAGE IS DARK | DARK SCENE |

1301

INFORMATION PROCESSING DEVICE, INFORMATION PROCESSING SYSTEM, AND INFORMATION PROCESSING METHOD

BACKGROUND OF THE INVENTION

Field of the Invention

The present invention relates to an information processing device, an information processing system, and an information processing method for supporting image capturing.

Description of the Related Art

With the recent popularization of digital cameras, digital video cameras, smartphones and the like, anyone can capture images easily. Moreover, due to the spread of social network services (SNS), a user can casually share image-captured content via the Internet. Therefore, demands for capturing and uploading beautiful and impressive images, interesting video images, and the like are increasing.

In particular, some beginners may desire to capture images like an expert who has advanced knowledge and techniques in capturing images. For techniques to support image capturing, web sites are available that provide comprehensive image-capturing support information, describing a plurality of content and image-capturing techniques on a subject category basis.

Further, a technique of sending a sample image on a server to an image-capturing device, based on the image-capturing conditions which the user inputted to the terminal is proposed (see Japanese Patent Application Publication No. 2007-027945). Furthermore, a technique in which the information on an image-capturing device and the image-capturing scene is notified to the server, and in which the server searches the corresponding set values of the image capturing from the database and sends the set values to the image-capturing device is proposed (see Japanese Patent Application Publication No. 2007-036716).

However, because the user performs the operation to notify the server of the image-capturing conditions, information on the image-capturing device, the image-capturing scene or the like, the image-capturing operation may be interrupted. Also, it is difficult for the user to acquire image-capturing support information at a desired timing, since the user has to wait for the transmission of the image-capturing support information from the server.

SUMMARY OF THE INVENTION

The present invention provides an information processing device that can acquire image-capturing support information suitable for an image-capturing scene at a desired timing, without interrupting an image-capturing operation.

The information processing device of the present invention includes: an acquiring unit configured to acquire information relating to user operation in an image-capturing device; a specifying unit configured to specify candidates of image-capturing support information to be presented to the user, based on the user operation in the image-capturing device; a control unit configured to control a timing of displaying the specified candidates of the image-capturing support information on a display unit of the image-capturing device, based on the user operation in the image-capturing device; and a setting unit configured to set the image-capturing support information, which is selected by the user, on the image-capturing device, out of the candidates of the image-capturing support information displayed on the display unit of the image-capturing device.

Further features of the present invention will become apparent from the following description of exemplary embodiments with reference to the attached drawings.

BRIEF DESCRIPTION OF THE DRAWINGS

FIG. 7 is a table for describing the category-based classification of the image-capturing support information:

FIG. 8 is a table for describing the category analysis based on the user operation;

FIG. 10 is a diagram for describing the selection of the image-capturing support information;

FIG. 11 is a table for describing the addition of conditions of the category analysis;

FIG. 12 is a table for describing the addition of conditions of image-capturing support information display timing items; and FIG. 13 is a table for describing the category analysis based on the captured image.

DESCRIPTION OF THE EMBODIMENTS

Embodiment

An embodiment of the present invention will be described in detail with reference to the drawings.

System Configuration

Figure 1:
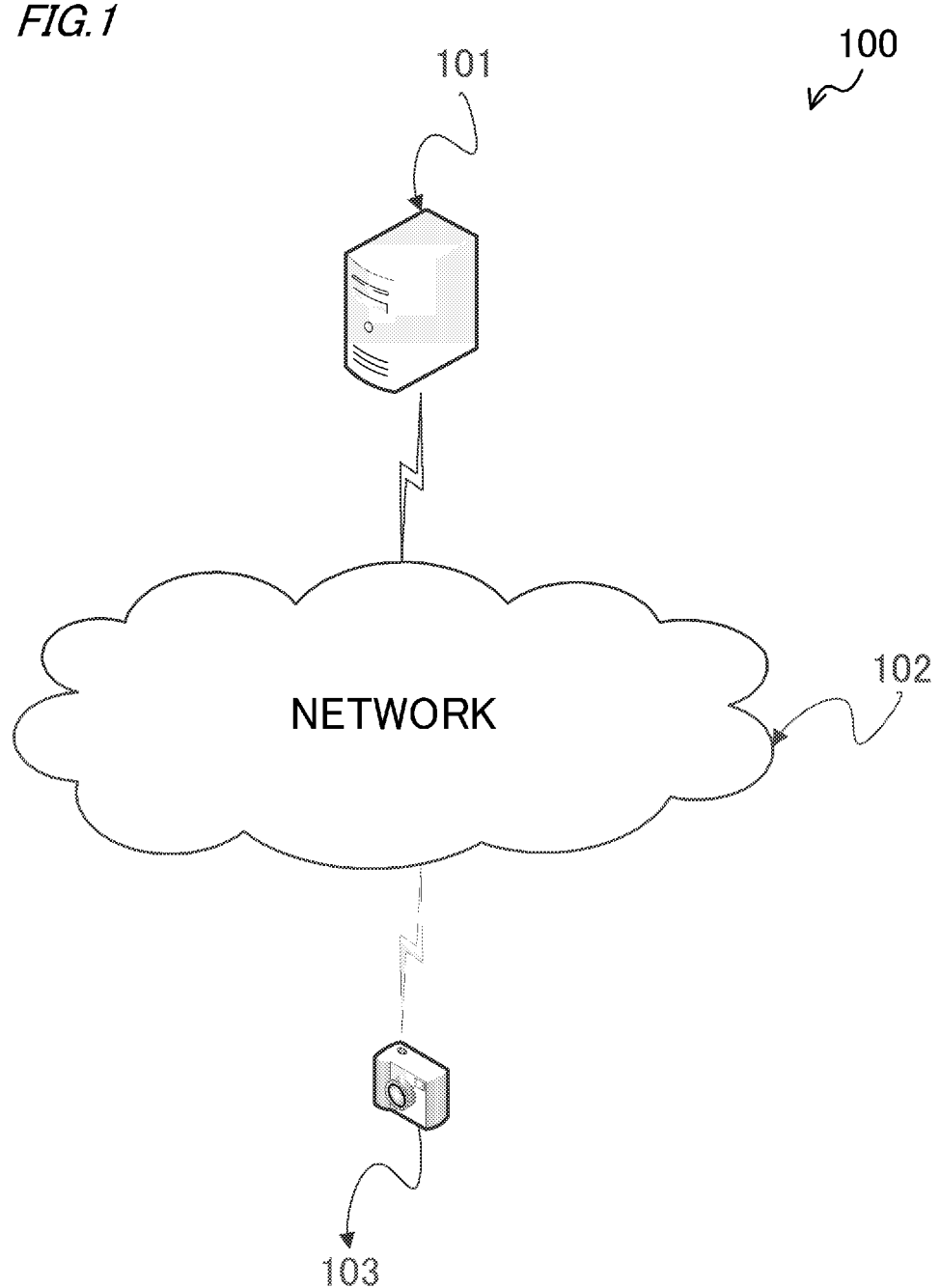
FIG. 1 is a diagram exemplifying a configuration of an image-capturing support system according to an embodiment.

FIG. 1 is a diagram exemplifying a configuration of an image-capturing support system 100 (information processing system) according to an embodiment. The image-capturing support system 100 includes an information processing device 101 and an image-capturing device 103. The information processing device 101 and the image-capturing device 103 are interconnected via a network 102, such as the Internet.

From the image-capturing device 103, the information processing device 101 receives information on a user operation on the image-capturing device 103 (hereafter also referred to as "operation information"). The information processing device 101 is an image-capturing support information analysis processing server which specifies the category of the image-capturing support information to be presented to the user and candidates of the image-capturing support information, by analyzing the received operation information.

The image-capturing device 103 detects a request for acquiring the image-capturing support information based on a user operation. The image-capturing support information includes contents of an image or a video image which include information to support image capturing for the user. The image-capturing device 103 displays the image-capturing target, and acquires the image-capturing support information, in accordance with the user operation, from the information processing device 101.

The information processing device 101, which has less limitations in storage capacity and throughput than the image-capturing device 103, can handle larger amounts of contents information and image-capturing support information. Further, the information processing device 101 can analyze more operations in a shorter time than the image-capturing device 103. The information processing device 101 and the image-capturing device 103 can transmit/receive information including the image-capturing support information, operation information and analysis results via such a network 102 as the Internet.

The example in FIG. 1 indicates the image-capturing support system 100 where the information processing device 101, in collaboration with the image-capturing device 103, implements analysis of the image-capturing support information, display of image-capturing support information, and the like, but the present invention is not limited to this. The image-capturing support system 100 may be implemented by one information processing device, or may be implemented by at least three information processing devices.

Hardware Configuration

Figure 2:
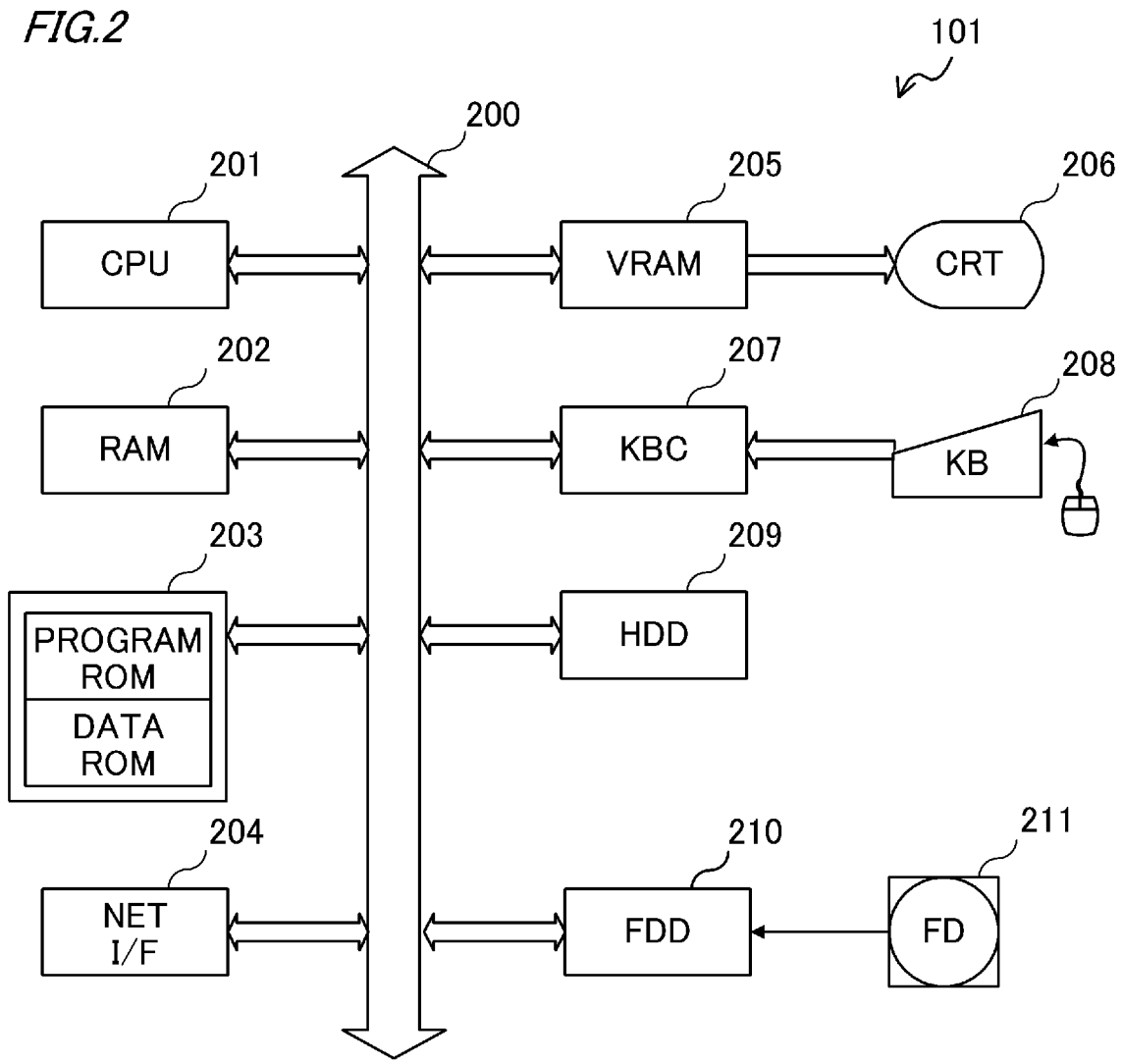
FIG. 2 is a diagram exemplifying a hardware configuration of an image processing device according to the embodiment.

FIG. 2 is a diagram exemplifying a hardware configuration of the information processing device 101 according to the present embodiment. A CPU 201 is a central processing unit that is in charge of the arithmetic operation and control of the information processing device 101. A RAM 202 is a random access memory and functions as a primary memory of the CPU 201. The RAM 202 also functions as a storage area to develop programs, and as an execution area and data area to execute programs.

A ROM 203 is a read only memory that stores an operation processing procedure of the CPU 201. The ROM 203 includes a program ROM and a data ROM. The program ROM records basic software (OS) which is a system program to control the information processing device 101. The data ROM records, for example, information used for operating a system. The information processing device 101 may use an HDD 209, a NAND type flash memory, an SD card, a solid-state drive (SSD) or the like instead of the ROM 203.

A NETIF 204 is a network interface. The information processing device 101 controls data transfers with the image-capturing device 103 and diagnoses the connection state via the NETIF 204. A VRAM 205 is a video RAM. The VRAM 205 controls so that the contents information, which indicates the operating state of the information processing device 101, and the image-capturing support information, are displayed on the screen of a CRT 206.

The CRT 206 is a display device (hereafter also referred to as "display 206"). A KBC 207 is a controller to control input signals from a KB (external input device) 208. The KB 208 is an external input device to receive a user operation. For example, the KB 208 is a pointing device (e.g. keyboard, mouse) or a touch panel display.

An HDD 209 is a hard disk drive, and is used to store application programs and various data. The information processing device 101 may use a NAND type flash memory, an SD card, a solid-state drive (SSD) or the like, instead of the HDD 209. An application program to implement the image-capturing support processing according to the present embodiment is a software program (module) to execute the functions of each unit of the information processing device 101.

An FDD 210 is an external input/output device such as a floppy disk drive, a CD-ROM drive and an SD card drive, to input/output data to/from a removable disk. The FDD 210 is used to read the above mentioned application programs stored in a removable disk (recording medium).

An FD 211 is a magnetic recording medium (e.g. flexible disk, external hard disk) which is read by the FDD 210, but is not limited to this. The recording medium (media) may be a removable data recording device (removable media), such as an optical recording medium (e.g. CD-ROM), a magneto optical recording medium (e.g. MO), and a semiconductor recording medium (e.g. SD card). The application programs or data stored in the HDD 209 may also be stored in the FD 211 and be accessed via the FDD 210.

The hardware configuration of the image-capturing device 103 is the same as that of the information processing device 101. In addition to the configuration illustrated in FIG. 2, the image-capturing device 103 also includes an imaging unit constituted of an image-capturing lens, a shutter, and image pickup elements (e.g. CCD, CMOS elements).

Functional Configuration

Figure 3:
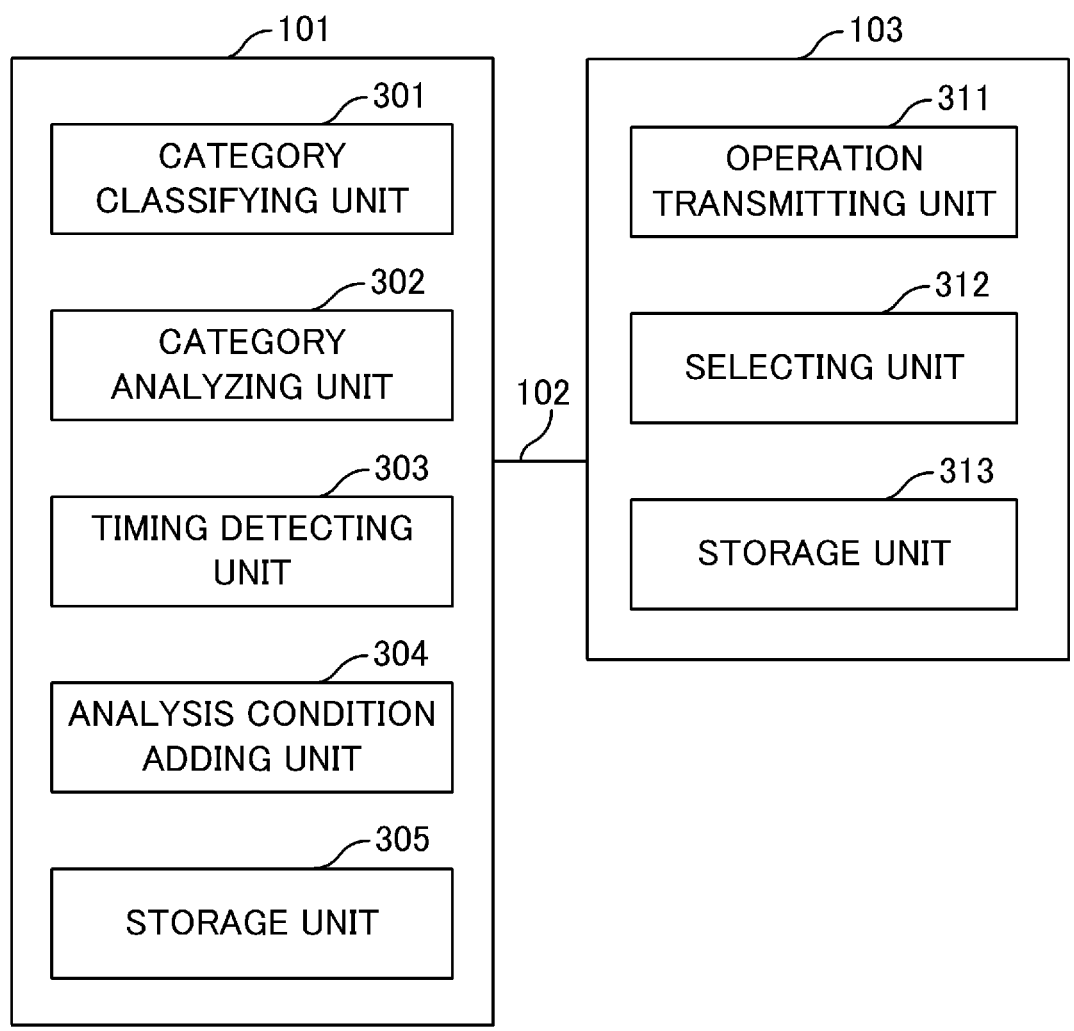
FIG. 3 is a block diagram exemplifying a functional configuration of the image-capturing support system according to the embodiment.

FIG. 3 is a block diagram exemplifying a functional configuration of the image-capturing support system 100 according to the present embodiment, constituted of the information processing device 101 and the image-capturing device 103. The information processing device 101 and the image-capturing device 103 are interconnected via the network 102, so as to transmit or receive various information.

The information processing device 101 includes a category classifying unit 301, a category analyzing unit 302, a timing detecting unit 303 and an analysis condition adding unit 304 as processing modules. The information processing device 101 also includes a storage unit 305 as a storage device to store information that is used for each processing module.

The image-capturing device 103 includes an operation transmitting unit 311 and a selecting unit 312 as processing modules. The image-capturing device 103 also includes a storage unit 313 as a storage device to store information that is used for each processing module.

The specific processing of each processing module included in the information processing device 101 and the image-capturing device 103, and information that is stored in the storage devices will be described in detail with reference to the processing flow charts in FIG. 4 and FIG. 5.

Each processing module of the information processing device 101 and the image-capturing device 103 is read by the ROM 203, the HDD 209 or the FDD 210 illustrated in FIG. 2, and is developed in the RAM 202. Each developed processing module operates as an application program or part of the program that is used by the CPU 201. The storage unit 305 in the information processing device 101 and the storage unit 313 in the image-capturing device 103 store the contents information, image-capturing support information, operation information and analysis results.

The information processing device 101 starts up the processing modules and the storage device automatically via the system, or via the KBC 107 in accordance with the information or instruction which the user inputted using the KB 208. The CPU 201 acquires information on the processing modules used for the operation and information stored in the storage device from the ROM 203, HDD 209, FDD 210 or RAM 202, and develops the information in the RAM 202 so as to start up the processing modules.

The CPU 201 writes the computed results in the RAM 202, HDD 209, FDD 210 and the like as the storage devices. The CPU 201 may display information on the computed result on the CRT 206 or the display unit of the image-capturing device 103 via the VRAM 205. Transmission among the CPU 201, RAM 202, ROM 203, NETIF 204, VRAM 205, KBC 207, HDD 209 and FDD 210 is performed via a transmission bus 200.

Image Capturing Support Processing

The image-capturing support processing will be described with reference to FIG. 4 and FIG. 5. FIG. 4 is a flow chart exemplifying the image-capturing support information acquisition processing in the information processing device. FIG. 5 is a flow chart exemplifying the image-capturing support information acquisition processing in the image-capturing device. In the following description, it is assumed that the image-capturing support information acquisition processing in FIG. 4 is executed by the information processing device 101, and the image-capturing support information acquisition processing in FIG. 5 is executed by the image-capturing device 103, but the present invention is not limited to this. The processing in each flow chart may be executed by one information processing device, or may be executed by the collaboration of at least three information processing devices.

In step S401, the category classifying unit 301 of the information processing device 101 acquires a plurality of image-capturing support information stored in the storage unit 305. In the storage unit 305, a plurality of image-capturing support information, based on advanced image-capturing knowledge and techniques, are stored in advance. The user may add new image-capturing support information to the storage unit 305, or may update the current image-capturing support information.

In step S401, the category classifying unit 301 may acquire the image-capturing support information which the user checked in a latest predetermined period (e.g. within last one month), out of a plurality of image-capturing support information stored in the storage unit 305. Further, the category classifying unit 301 may acquire a predetermined number of cases (e.g. 30) of information out of the image-capturing support information, in sequence from information of which time when it was added to the storage unit 305 is the latest.

Figure 6:
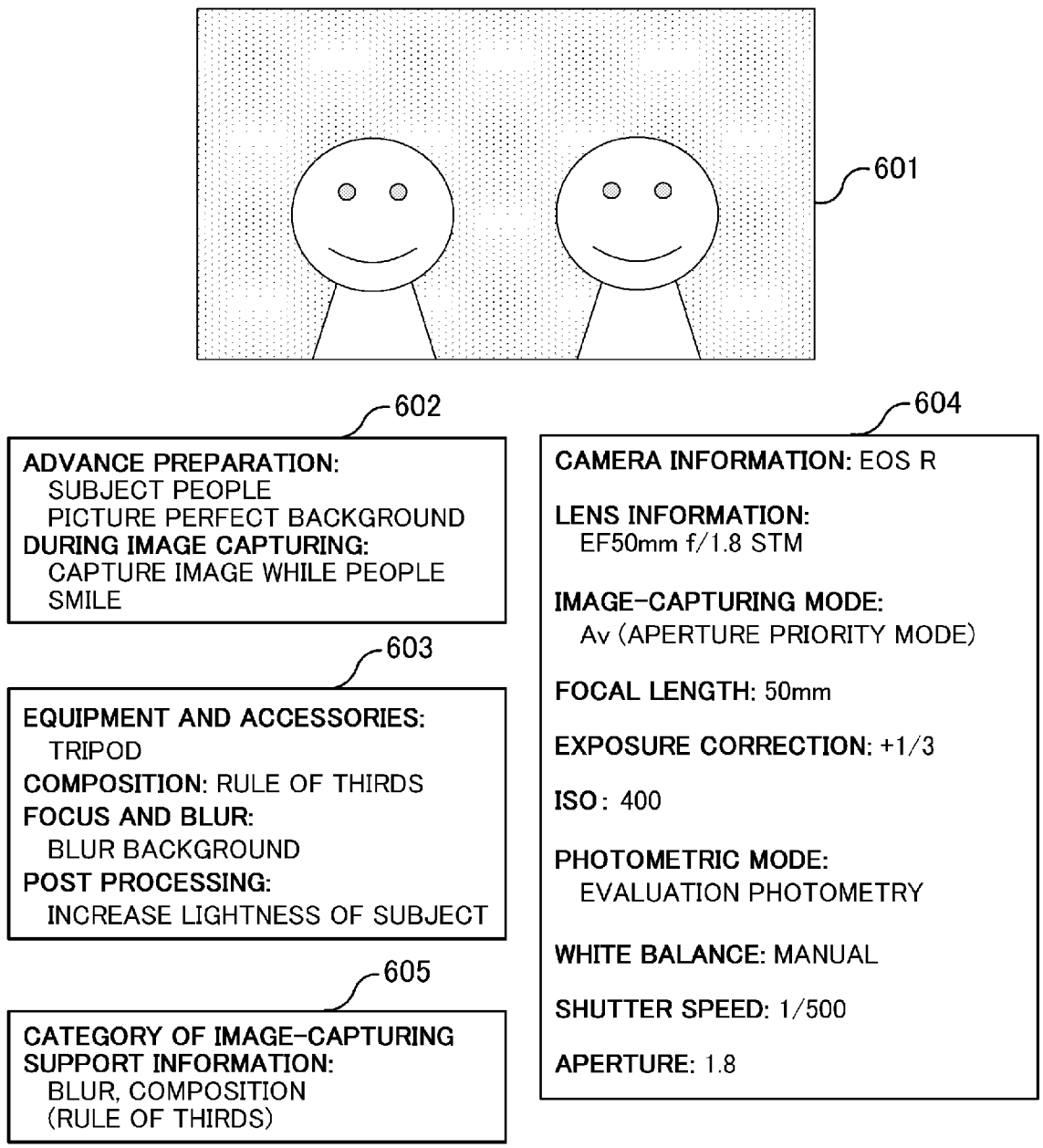
FIG. 6 is a diagram for describing the image-capturing support information.

Now the image-capturing support information will be described with reference to FIG. 6. FIG. 6 is a diagram for describing the image-capturing support information. The image-capturing support information is information for capturing an image of highly evaluated contents, such as beautiful and impressive images and interesting video images. FIG. 6 is an example of the image-capturing support information when a portrait of people is captured. The image-capturing support information includes: a sample image 601; an image-capturing procedure 602; image-capturing tips 603; image-capturing device information and set values 604; and image-capturing support information category 605. The image-capturing support information may include the image-capturing mode and the set values of the image-capturing device 103.

The sample image 601 is a sample of an image captured by using the image-capturing support information. By checking the sample image 601, the user can imagine the kind of image that will be captured in the case of using the image-capturing support information.

The image-capturing procedure 602 is information on the image-capturing procedure, such as advance preparation related to a subject, background or the like, and the pose or movement of the subject when the image is captured. The image-capturing tips 603 is information on tips to capture a better image, such as the equipment and accessories used for capturing an image, composition to dispose the subject, focus, blur and post processing. The image-capturing device information and set values 604 is information on the image-capturing device, such as camera information and lens information, and information on set values of the image-capturing device used for capturing the image, such as image-capturing mode, focal distance, exposure correction, ISO sensitivity, photometric mode, white balance, shutter speed and aperture.

The image-capturing support information category 605 is information that indicates the category into which the image-capturing support information, included in the sample image 601, the image-capturing procedure 602, the image-capturing tips 603 and the image-capturing device information and set values 604 is classified. The critical points of the image-capturing support information indicated in FIG. 6 are: "people are focused but background is not focused and artfully blurred", and "the subject is disposed in a good balance based on the rule of thirds". Therefore the image-capturing support information in FIG. 6 is classified into the image-capturing support information category of "blur" and "composition (rule of thirds)". Besides the above mentioned items, the image-capturing support information may include other information related to image capturing, such as image-capturing location and image-capturing time.

Figure 4:
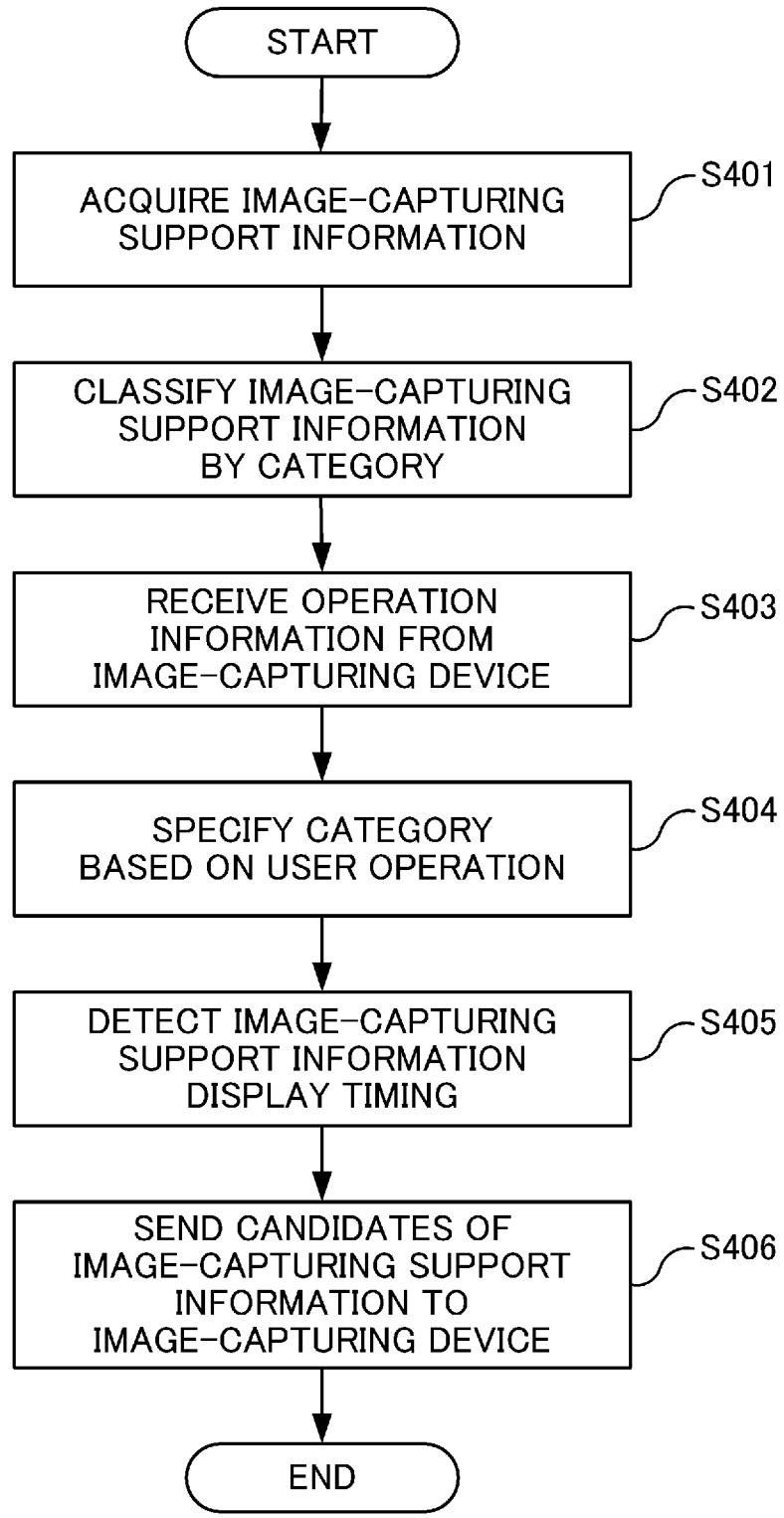
FIG. 4 is a flow chart exemplifying the image-capturing support information acquisition processing by the information processing device.

In step S402 in FIG. 4, the category classifying unit 301 classifies the acquired plurality of image-capturing support information by category, based on the category information of the image-capturing support information.

Now the category-based classification of the image-capturing support information will be described with reference to FIG. 7. FIG. 7 is a table for describing the category-based classification of image-capturing support information. In step S401, the category classifying unit 301 acquires a plurality of image-capturing support information stored in the storage unit 305. The category classifying unit 301 classifies the acquired image-capturing support information by category related image-capturing techniques, based on the category 605 of the image-capturing support information. By classifying the image-capturing support information by category, the category classifying unit 301 creates a table to identify the category corresponding to the image-capturing support information as indicated in FIG. 7.

The image-capturing support information 701 lists image-capturing support information names. In the example in FIG. 7, the category classifying unit 301 acquires the image-capturing support information for the "portrait image capturing of people" (703), "macro image capturing of flowers" (704), "image capturing of moving subject" (705) and image capturing of night view (706) in step S401.

The image-capturing support information category 702 lists the categories to which each image-capturing support information is classified. "Blur" is a category related to the technique of blurring to display a beautiful blurred background. "Composition" is a category related to a technique to dispose the subject with good balance using the rule of thirds, for example. "Zoom" is a category related to a technique of zooming to capture a magnified image of the subject. "Tinge" is a category related to a technique to adjust the color tone of an image. "Stop subject" is a category related to a technique to capture a moving subject in the stopped state without blur. "Dark scene" is a category related to a technique to capture a bright image in a dark scene. "Focus on entire area" is a category related to a technique to capture an image in a state of an entire area in focus when an image of a landscape is captured.

In FIG. 7, the image-capturing support information on the portrait image capturing of people (703) is classified into the categories "blur" and "composition". The macro image capturing of flowers (704) is classified into the categories of "blur", "zoom" and "color tone". The "image capturing of moving subject" (705) is classified into the category "stop subject", and the "image capturing of night view" (706) is classified into categories "dark scene" and "focus on entire area".

In step S403 in FIG. 4, the category analyzing unit 302 of the information processing device 101 receives operation information from the image-capturing device 103. The operation information is information on operation that relates to the image capturing of the image-capturing device 103 and that is received from the user. The operation information includes, for example, information on the operation to select such an image-capturing mode as Av mode and Tv mode, and the operation to set white balance, shutter speed, aperture (F value) and the like. The operation information may include information from various sensors, which detect an operation to search an angle of view by turning the image-capturing device 103 up, down left or right. Using the operation information, the category analyzing unit 302 can analyze the category corresponding to the user operation.

In step S404, the category analyzing unit 302 analyzes (specifies) an appropriate category of the image-capturing support information to support image capturing by the user, based on the user operation included in the operation information received in step S403.

Now the categories of the image-capturing support information corresponding to each user operation will be described with reference to FIG. 8. FIG. 8 is a table for describing category analysis based on the user operation. The column of operation 801 lists operation names. The column of image-capturing support information category 802 lists the image-capturing support information category corresponding to each operation.

The operation 801 includes the setting change before image capturing, operation during image capturing, contents check after image capturing, and repeat of these operations. For example, the operation 801 includes "Av mode selection" to select the aperture priority mode, and "Tv mode selection" to select the shutter speed priority mode, as the image-capturing mode of the image-capturing device 103. The operation of the "Av mode selection" and "Tv mode selection" can be detected by pressing the mode selection switch, for example.

The operation 801 also includes "live view scanning" with the image-capturing device to search an angle of view to capture images e in the up, down, left or right direction in the live view display state. The operation of the "live view scanning" can be detected by detecting the user moving the image-capturing device 103 in the up, down, left or right direction using a sensor to detect the pose of the user, for example.

The operation 801 includes: "white balance setting". "shutter speed setting: decrease/increase" and "aperture (F value) setting: increase/decrease" as the setting operation for the image-capturing device 103. The operation of setting the "white balance", "shutter speed" or "aperture (F value)" can be detected when a setting target item is selected and the dial operation to specify the set value is performed, for example.

The operation 801 is corresponded with a category of the image-capturing support information (image-capturing technique) related to each operation. Using the table in FIG. 8, the category analyzing unit 302 can specify the categories to be candidates of the image-capturing support information for the user to use, based on the user operation received in step S403.

In a case where the user operation is the "Av mode selection", the category analyzing unit 302 specifies the category "blur" as a candidate category of the image-capturing support information (803). In a case where the user operation is the "Tv mode selection", the category "stop subject" is specified as a candidate category of the image-capturing support information (804).

In a case where the user operation is the "live view scanning", the category "composition" is specified as a candidate category of the image-capturing support information (805). In a case where the user operation is the "white balance setting", the category "color tone" is specified as a candidate of the image-capturing support information (806).

In a case where the user operation is the "shutter speed: decrease", that is, in a case where the set value of the shutter speed is set to a value larger than the current value, the category "dark scene" is set as a candidate category of the image-capturing support information (807). In a case where the user operation is the "shutter speed: increase", that is, in a case where the set value of the shutter speed is set to a value smaller than the current value, the category "stop subject" is specified as a candidate category of the image-capturing support information (808).

In a case where the user operation is the "aperture (F value): increase", the category "focus on entire area" is specified as a candidate category of the image-capturing support information (809). In a case where the user operation is the "aperture (F value): decrease", the category "blur" is specified as a candidate of the image-capturing support information (810).

In step S405 in FIG. 4, the timing detecting unit 303 analyzes the user operation from the operation information received from the image-capturing device 103, and detects the display timing of the image-capturing support information. The timing detecting unit 303 can receive information on the user operation anytime, and is not limited to the operation received in step S403, and can detect the display timing of the image-capturing support information.

Figure 9:
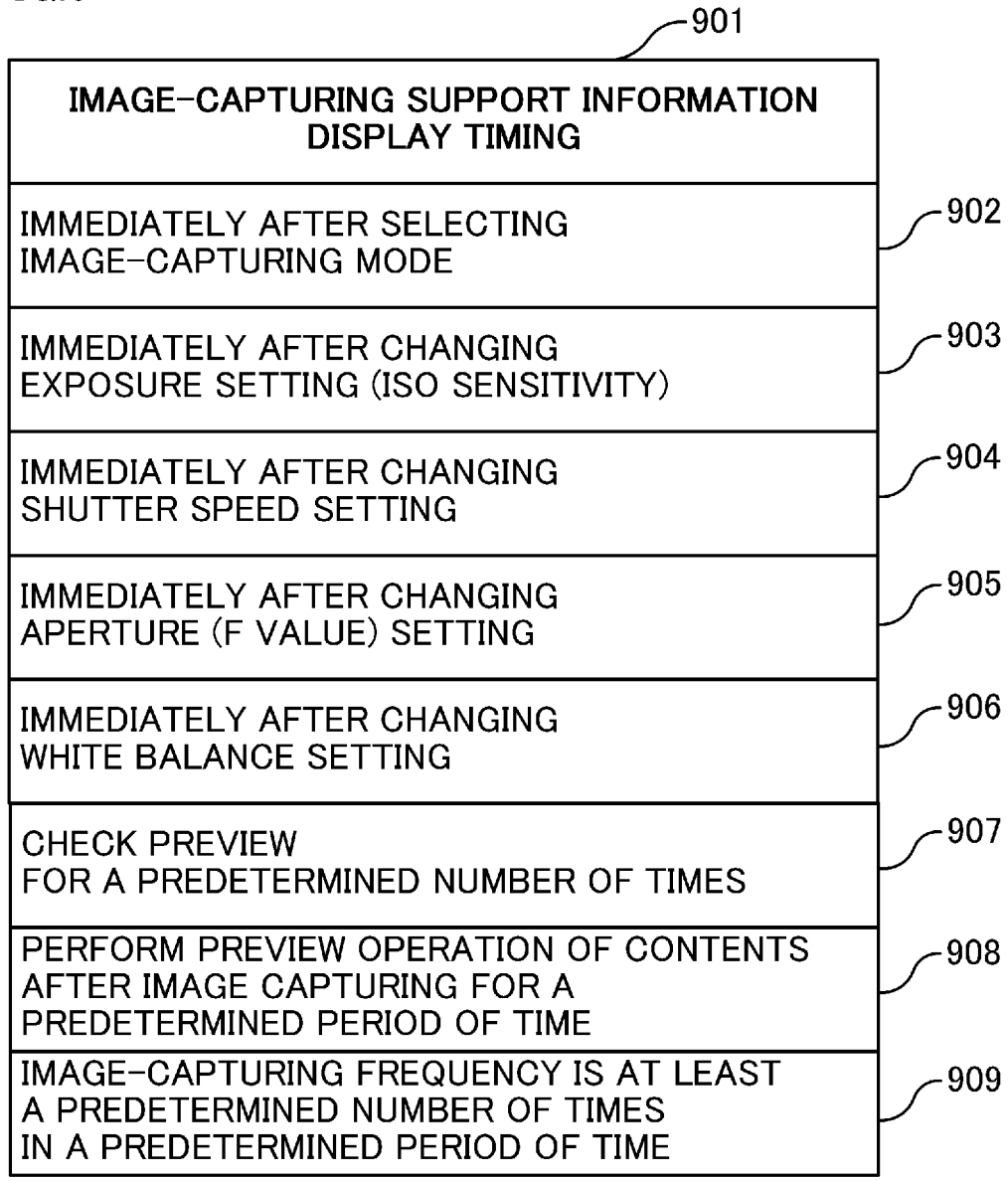
FIG. 9 is a table for describing the detection of an image-capturing support information display timing.

Now the detection of timing to display the image-capturing support information will be described with reference to FIG. 9. FIG. 9 is a table for describing the detection of an image-capturing support information display timing. The timing detecting unit 303 of the information processing device 101 analyzes the operation information received in step S403, and detects a predetermined timing to display candidates of the image-capturing support information on the display 206 (display unit) of the image-capturing device 103. This predetermined timing is a timing used as a trigger for processing to display the image-capturing support information on the display 206.

In FIG. 9, an image-capturing support information display timing 901 is a predetermined timing when the timing detecting unit 303 detects the timing to display the image-capturing support information.

The image-capturing support information display timing 901 is, for example, "immediately after selecting image-capturing mode" (902), "immediately after changing exposure setting (ISO sensitivity)" (903), "immediately after changing shutter speed setting" (904), "immediately after changing aperture (F value) setting" (905), and "immediately after changing white balance setting" (906). Further, the image-capturing support information display timing 901 is a timing w % ben satisfying such a condition as "check preview for predetermined number of times" (907), "perform the preview operation of contents after image capturing for a predetermined period of time" (908), or "image-capturing frequency that is at least a predetermined number of times in a predetermined period of time" (909), and the like.

Finally in step S406 in FIG. 4, in a case where a predetermined image-capturing support information display timing indicated in FIG. 9 is detected based on the operation information, the timing detecting unit 303 selects the image-capturing support information of the category specified in step S404 as a candidate, and sends this information to the image-capturing device 103. By sending the candidate of the image-capturing support information to the image-capturing device 103 at a detected timing, the timing detecting unit 303 can control the timing when the candidate of the image-capturing support information is displayed. By this display control, the user can acquire the image-capturing support information at a desired timing.

The image-capturing support information display timing 901 may be corresponded with the category of the image-capturing support information. In this case, in S406, the timing detecting unit 303 may select the image-capturing support information of the category corresponding to the detected image-capturing support information display timing as a candidate, and send (set) this information to the image-capturing device 103.

Figure 5:
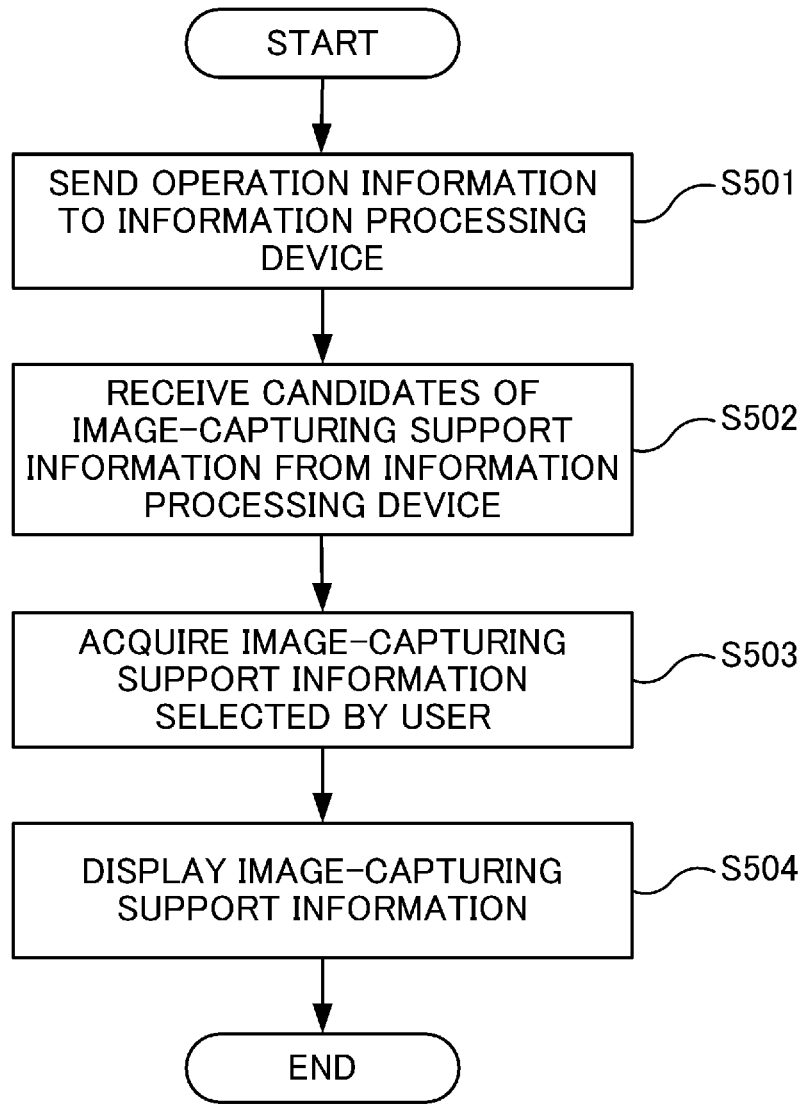
FIG. 5 is a flow chart exemplifying the image-capturing support information acquisition processing by an image-capturing device.

FIG. 5 is a flow chart exemplifying the image-capturing support information acquisition processing in the image-capturing device 103. In step S501, the operation transmitting unit 311 of the image-capturing device 103 acquires operation information from user operation, and sends the operation information to the information processing device 101. The operation information may include information on a plurality of operations performed by the user. The operation information also includes information to analyze the image-capturing support information display timing, such as operation time, number of times of operation and operation intervals. The processing in step S501 is processing corresponding to step S403 in FIG. 4.

In step S502, the selecting unit 312 receives candidates of the image-capturing support information from the information processing device 101. This is processing corresponding to step S406 in FIG. 4.

In step S503, the selecting unit 312 acquires the image-capturing support information selected by the user, out of the candidates of the image-capturing support information received in step S502. In step S504, the selecting unit 312 displays the image-capturing support information acquired in step S503, on the display 206. In the example in FIG. 10, two candidates of the image-capturing support information are displayed, but a number of candidates of the image-capturing support information is not limited to two, and may be one or at least three.

Now selection of the image-capturing support information will be described with reference to FIG. 10. FIG. 10 is a diagram for describing selection of the image-capturing support information. The selection of the image-capturing support information is processing for the user to check the detailed contents of the image-capturing support information, or to select image-capturing support information to be used for actual image processing out of the candidates. The selecting unit 312 acquires the detailed contents of the image-capturing support information selected by the user, and displays the contents on the display 206. The selecting unit 312 can acquire the image-capturing support information from the information processing device 101 or the storage unit 313.

The selecting unit 312 of the image-capturing device 103 receives the candidates of the image-capturing support information from the information processing device 101. Then the selecting unit 312 displays the image-capturing support information, which the user selected out of the candidates of the image-capturing support information, on the display 206. These are the processing steps corresponding to steps S503 and S504 in FIG. 5.

The display screen 1001 in FIG. 10 is an example of displaying the candidates of the image-capturing support information corresponding to the category "blur" on the display 206. The display screen 1001 displays image-capturing support information of "portrait image capturing of people" (1002) and "macro image processing of flowers" (1003).

In a case where the user sets the image-capturing mode of the image-capturing device 103 to the Av mode in step S501 in FIG. 5, for example, the category analyzing unit 302 specifies the category "blur" as the category of a candidate of the image-capturing support information in step S404 in FIG. 4. In step S405, the timing detecting unit 303 detects "immediately after selecting image-capturing mode: (902) as the image-capturing support information display timing 901. In step S406, the information processing device 101 sends the "portrait image capturing of people (703) and the "macro image capturing of flowers" (704), which are candidates of the image-capturing support information corresponding to the category "blur", to the image-capturing device 103.

In step S502, the selecting unit 312 receives the candidates of the image-capturing support information, and displays an overview of the image-capturing support information on the display 206. The user specifies a candidate of the image-capturing support information that is close to the image the user desires to capture. The selecting unit 312 acquires the image-capturing support information selected by the user, out of the candidates of the image-capturing support information (step S503). When a request to acquire the image-capturing support information selected by the user is received from the selecting unit 312, the information processing device 101 sets the detailed contents of this image-capturing support information in the image-capturing device 103. The selecting unit 312 displays the detailed contents of the acquired image-capturing support information on the display 206, as illustrated in FIG. 6.

The display screen 1004 in FIG. 10 is an example of displaying candidates of the image-capturing support information corresponding to the category "stop subject" on the display 206, in a case where the user set the image-capturing mode to the Tv mode, or performed the setting operation to increase the shutter speed. The display screen 1001 displays the image-capturing support information of the "image capturing of moving subject" (1005) and "image capturing of subject moving fast" (1006).

The display screen 1007 in FIG. 10 is an example of displaying candidates of the image-capturing support information corresponding to the category "dark scene" on the display 206 in the case where the user set the shutter speed slower. The display screen 1007 displays the image-capturing support information of "image capturing of night view" (1008) and "image capturing of people indoors" (1009).

In the processing indicated in FIG. 4 and FIG. 5, the display timing of the image-capturing support information is detected by the information processing device 101, but the present invention is not limited to this. The display timing of the image-capturing support information may be detected by the image-capturing device 103. In this case, in step S504, the selecting unit 312 may detect the display timing of the image-capturing support information based on the operation information, and display the image-capturing support information, which was acquired in step S503, on the display 206 in a case where a predetermined timing is detected.

Functional Effect of Embodiment

According to the above embodiment, the information processing device 101 can immediately present the image-capturing support information that is suitable for the subject and scene, out of the many image-capturing support information, without the user checking the image-capturing support information suitable for a subject in advance. Therefore the user can concentrate on image capturing without missing image-capturing chances, and perform the image-capturing operation with applying a setting based on the presented image-capturing support information.

Further, the user can check or actually use the image-capturing support information that is suitable for the subject and scene by inputting the image-capturing conditions (e.g. subject, scene, set values of image-capturing device 103) without consciously searching the image-capturing support information. Therefore the user can concentrate on the image-capturing operation.

Modification 1

Modification 1 is an example when the user adds an analysis condition for the category analyzing unit 302 to specify the category of the candidates of the image-capturing support information (FIG. 8), or an analysis condition for the timing detecting unit 303 to detect the image-capturing support information display timing (FIG. 9). The addition of the analysis condition according to Modification 1 will be described with reference to FIG. 11 and FIG. 12.

FIG. 11 is a table for describing the addition of conditions of the category analysis. An analysis condition adding unit 304 is a unit for the user to add a new analysis condition to correspond the image-capturing operation to the category of the image-capturing support information.

In the example in FIG. 11, the analysis condition to correspond the image-capturing operation "exposure setting (ISO sensitivity) change" to the category "dark scene" (1101) is added to the table in FIG. 8, which indicates the correspondence of the image-capturing operation 801 and the image-capturing support information category 802. Based on the added analysis condition, the category analyzing unit 302 can specify the category "dark scene" for the image-capturing operation of "exposure setting (ISO sensitivity) change" as the category of the candidate of the image-capturing support information.

FIG. 12 is a table for describing the addition of conditions of image-capturing support information display timing. The analysis condition adding unit 304 is a unit for the user to add a new image-capturing support information display timing. In the example in FIG. 12, as an analysis condition, the timing of "preview of contacts is magnified and displayed after image capturing for at least a predetermined number of times in a predetermined period of time" is newly added to the table, indicating the image-capturing support information display timing 901 in FIG. 9 (1201).

In this way, the user can newly add an analysis condition to specify a category of a candidate of the image-capturing support information, or an analysis condition to detect a timing to display the image-capturing support information.

Modification 2

In the above embodiment, the category analyzing unit 302 specifies the category of a candidate of the image-capturing support information using the information on the image-capturing operation by the user in step S404 in FIG. 4. In Modification 2, on the other hand, the category analyzing unit 302 specifies a category of a candidate of the image-capturing support information by analyzing the contents after image capturing (captured image). The specification of the category according to Modification 2 will be described with reference to FIG. 13.

FIG. 13 is a table for describing category analysis based on the captured image. For example, in a case where a plurality of pixels of the captured image have a brightness that is not more than a predetermined value, the analysis result is determined that the "image is dark". In the case where the analysis result of the image is determined that the "image is dark", the category analyzing unit 302 specifies the category "dark scene" as a category of a candidate of the image-capturing support information (1301). The captured image may be a live view image acquired by the image-capturing device 103.

Other

In the above description of the embodiment, an image was used for contents, but the information processing device 101 may use other contents, such as a moving image and sound. Further, in the above description, the image-capturing procedure, tips on image capturing, sample image, image-capturing mode and set values of the image-capturing device were used for the image-capturing support information, but other information related to image capturing, such as image-capturing equipment, weather and locations, may be used.

The object of the present invention is achieved by executing the following processing. In other words, this processing is a processing of supplying a storage medium, in which program codes to implement the above mentioned functions of the embodiment are stored, to the system or device, and the computer (e.g. CPU, MPU) of the system or the device reading the program codes stored in the storage medium.

In this case, the program codes, read from the storage medium, implement the above mentioned functions of the embodiment, and the program codes and the storage medium storing the program codes constitute the present invention.

For examples of the storage medium to supply program codes, the following can be used: a floppy (registered trademark) disk, hard disk, magneto optical disk, CD-ROM, CD-R. CD-RW, DVD-ROM, DVD-RAM, DVD-RW, DVD+RW, magnetic tape, non-volatile memory card, ROM or the like. The program codes may be downloaded via a network as well.

A case where the above mentioned functions of the embodiment are implemented by executing the program codes read by a computer is also included in the present invention. In addition, a case where an operating system (OS) or the like running on a computer performs part or all of the actual processing based on instructions of the program codes, and the above mentioned functions of the embodiment are implemented by this processing, is also included in the present invention.

Furthermore, a case where the above mentioned functions of the embodiment are implemented by the following processing is also included in the present invention. That is, program codes read from the storage medium are written in memory included in the function-extension board inserted in the computer, or in a function-extension unit connected to the computer. Then based on the instructions of the program codes, the CPU or the like included in the function-execution board or the function-extension unit performs part or all of the actual processing.

Furthermore, a case where the above mentioned functions of the embodiment are implemented on a plurality of computers via a network is also included in the present invention. For example, this is a case where each function is shared by a server and a client, and the server processes the managing function and the client processes the display function. The present invention is not limited to this, and each computer may execute part or all of each processing.

While preferred embodiments of the present invention have been described, the present invention is not limited to these embodiments, and may be modified and changed in various ways within the scope of the essence thereof.

According to the present invention, image-capturing support information suitable for the image-capturing scene may be acquired at a desired timing without interrupting the image-capturing operation.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-055643, filed on Mar. 26, 2020, which is hereby incorporated by reference herein in its entirety.

What is claimed is:

1. An information processing device comprising at least one memory and at least one processor which function as:
   an acquiring unit configured to acquire information relating to user operation in an image-capturing device;
   a specifying unit configured to specify candidates of image-capturing support information to be presented to the user, based on the user operation in the image-capturing device;
   a control unit configured to control a timing of displaying the specified candidates of the image-capturing support information on a display unit of the image-capturing device, based on the user operation in the image-capturing device; and
   a setting unit configured to set the image-capturing support information, which is selected by the user, on the image-capturing device, out of the candidates of the image-capturing support information displayed on the display unit of the image-capturing device.

2. The information processing device according to claim 1, wherein the specifying unit analyzes a category of the image-capturing support information to be presented to the user, based on at least the user operation in the image-capturing device or the captured image and specify the candidates of image-capturing support information corresponding to the analyzed category.

3. The information processing device according to claim 1, wherein the at least one memory and the at least one processor further function as a classifying unit configured to classify, by category, a plurality of image-capturing support information items acquired from a storage unit, which stores the plurality of image-capturing support information items.

4. The information processing device according to claim 1, wherein the image-capturing support information to be presented to the user includes at least any of image-capturing procedure, tips on image capturing, sample images, image-capturing modes, and set values of the image-capturing device.

5. The information processing device according to claim 2, wherein the category of the image-capturing support information is a category relating to an image-capturing technique.

6. The information processing device according to claim 1, wherein the user operation in the image-capturing device includes setting change before image capturing, operation during image capturing, checking content after image capturing, and repeat of these operations.

7. The information processing device according to claim 1, wherein the at least one memory and the at least one processor further function as an adding unit configured for the user to add, as an analysis condition, a condition to specify by the specifying unit candidates of the image-capturing support information to be presented to the user, or a condition to detect a timing of displaying the candidates of the image-capturing support information on the display unit of the image-capturing device.

8. An information processing system including an information processing device and an image-capturing device, wherein
   the information processing device includes at least one memory and at least one processor which function as:
   an acquiring unit configured to acquire information relating to user operation in the image-capturing device;
   a specifying unit configured to specify candidates of image-capturing support information to be presented to the user, based on the user operation in the image-capturing device;
   a control unit configured to control a timing of displaying the specified candidates of the image-capturing support information on a display unit of the image-capturing device, based on the user operation in the image-capturing device; and a setting unit configured to set the image-capturing support information, which is selected by the user, on the image-capturing device, out of the candidates of the image-capturing support information displayed on the display unit of the image-capturing device, wherein the image-capturing device includes at least one memory and at least one processor which function as a display unit configured to display image-capturing support information, which is set by the information processing device, on the display unit of the image-capturing device.

9. The information processing system according to claim 8, wherein the at least one memory and the at least one processor of the image-capturing device further function as:

a transmitting unit configured to transmit, to the information processing device, information on the user operation in the image-capturing device; and a receiving unit configured to receive the specified candidates of the image-capturing support information from the information processing device.

10. An information processing method comprising:

an acquiring step of acquiring information relating to user operation on an image-capturing device;

a specifying step of specifying candidates of image-capturing support information to be presented to the user, based on user operation in the image-capturing device;

a controlling step of controlling a timing of displaying the specified candidates of the image-capturing support information on a display unit of the image-capturing device, based on the user operation in the image-capturing device, and a setting step of setting the image-capturing support information, which is selected by the user, on the image-capturing device, out of the candidates of the image-capturing support information displayed on the display unit of the image-capturing device.

11. A non-transitory computer readable medium that stores a program for causing a computer to execute:

an acquiring step of acquiring information relating to user operation on an image-capturing device;

a specifying step of specifying candidates of image-capturing support information to be presented to the user, based on user operation in the image-capturing device;

a controlling step of controlling a timing of displaying the specified candidates of the image-capturing support information on a display unit of the image-capturing device, based on the user operation in the image-capturing device, and a setting step of setting the image-capturing support information, which is selected by the user, on the image-capturing device, out of the candidates of the image-capturing support information displayed on the display unit of the image-capturing device.

* * * * *